Sept. 13, 1932.  W. E. WUNDERLICH  1,877,111
SHAPING MACHINE
Filed May 28, 1930    7 Sheets-Sheet 1
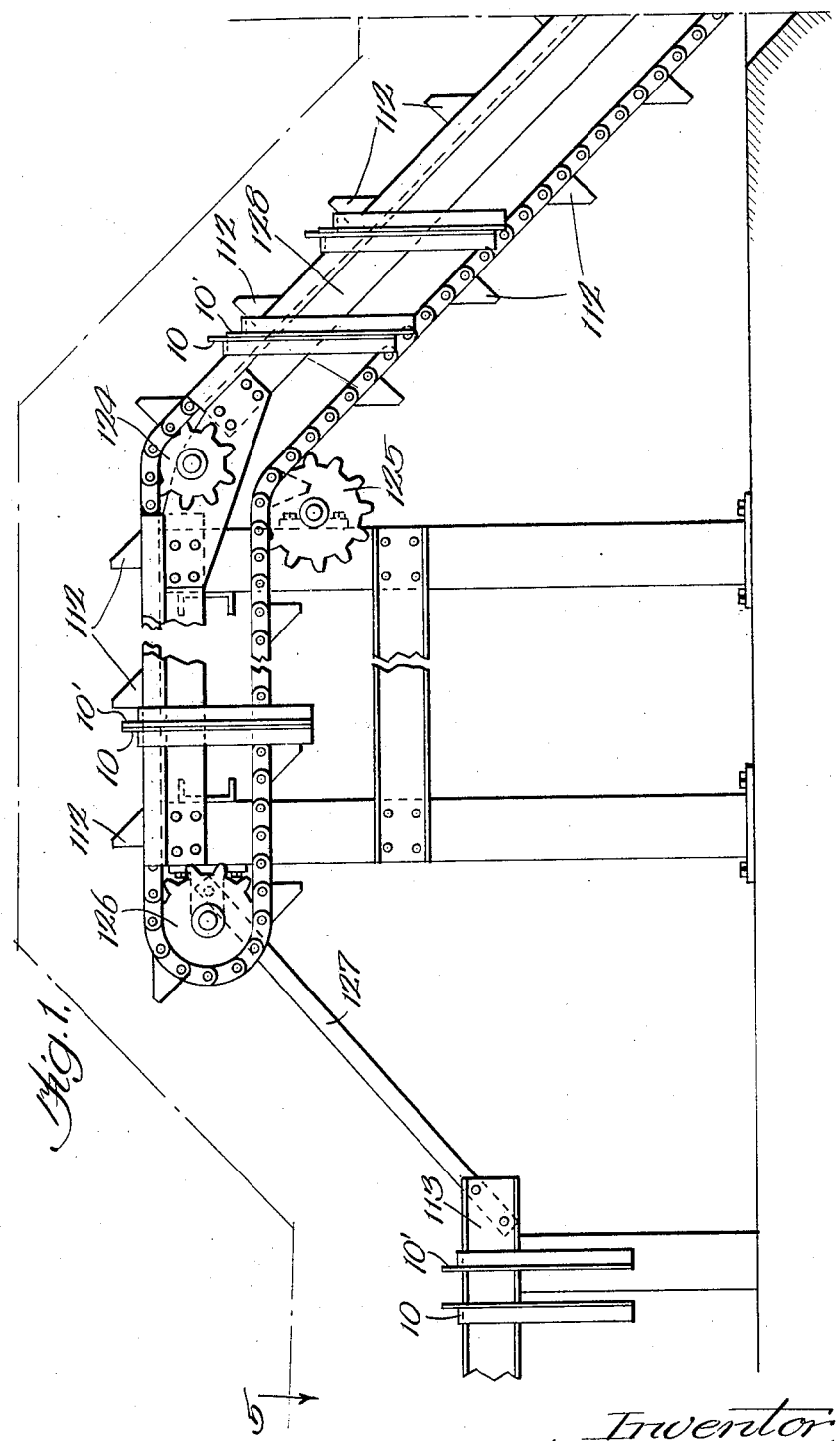
Inventor:
William E. Wunderlich.
By G. L. Cragg Atty.

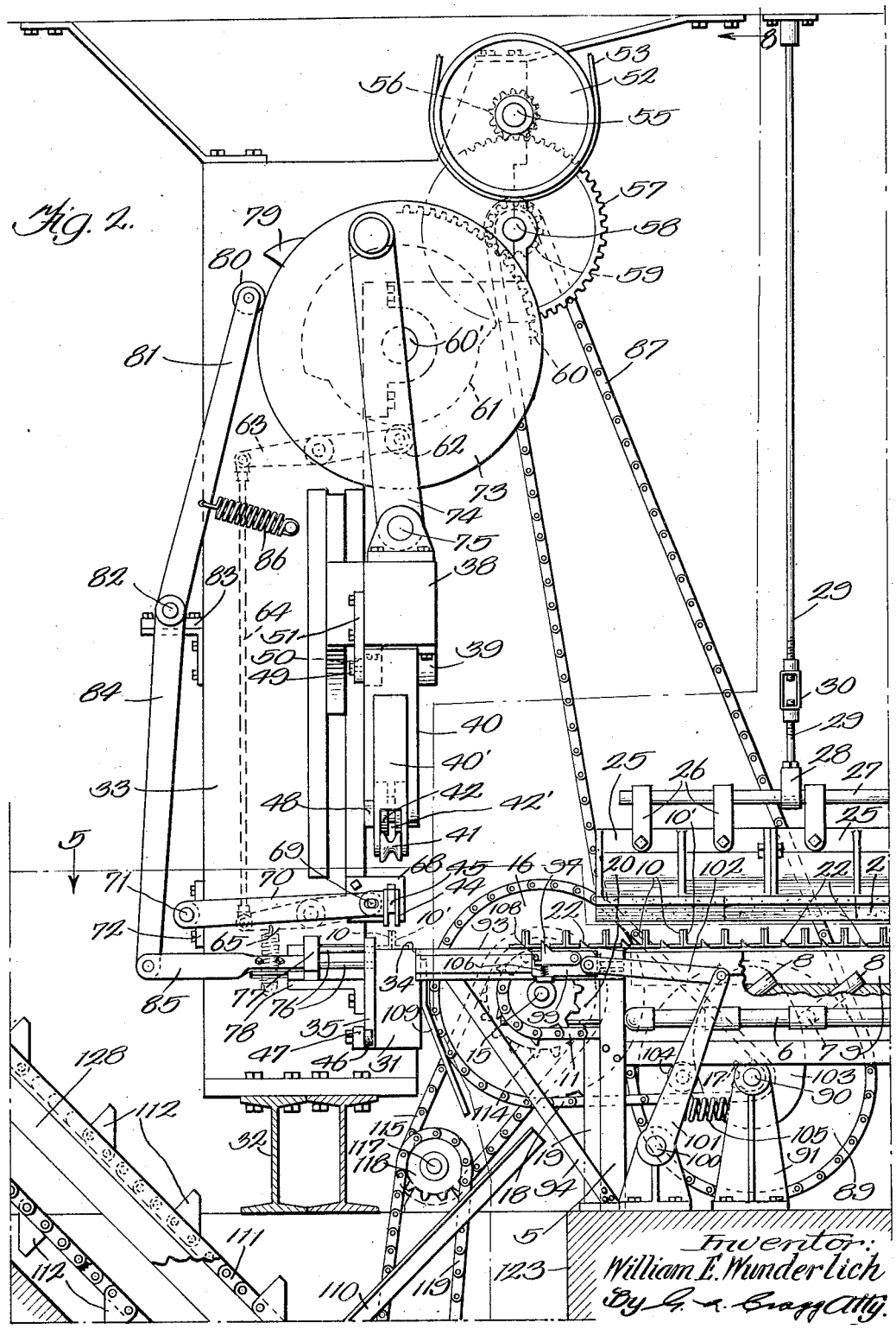

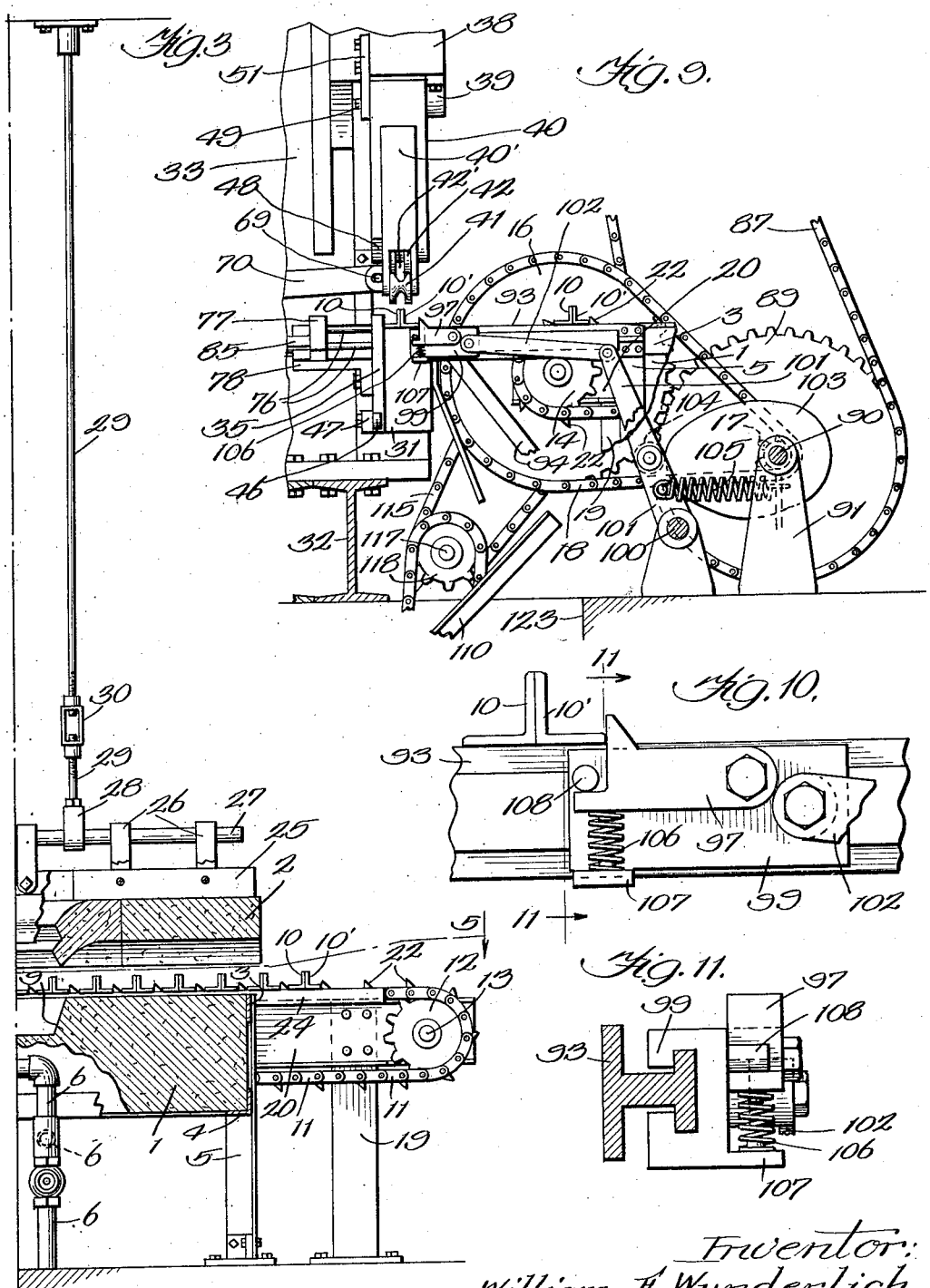

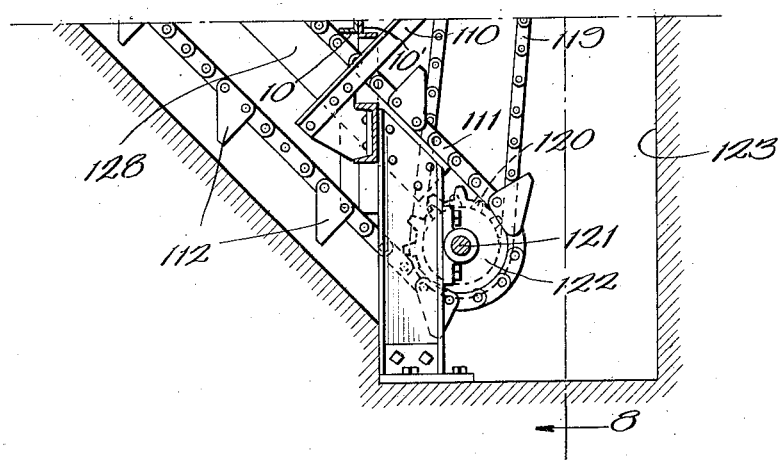
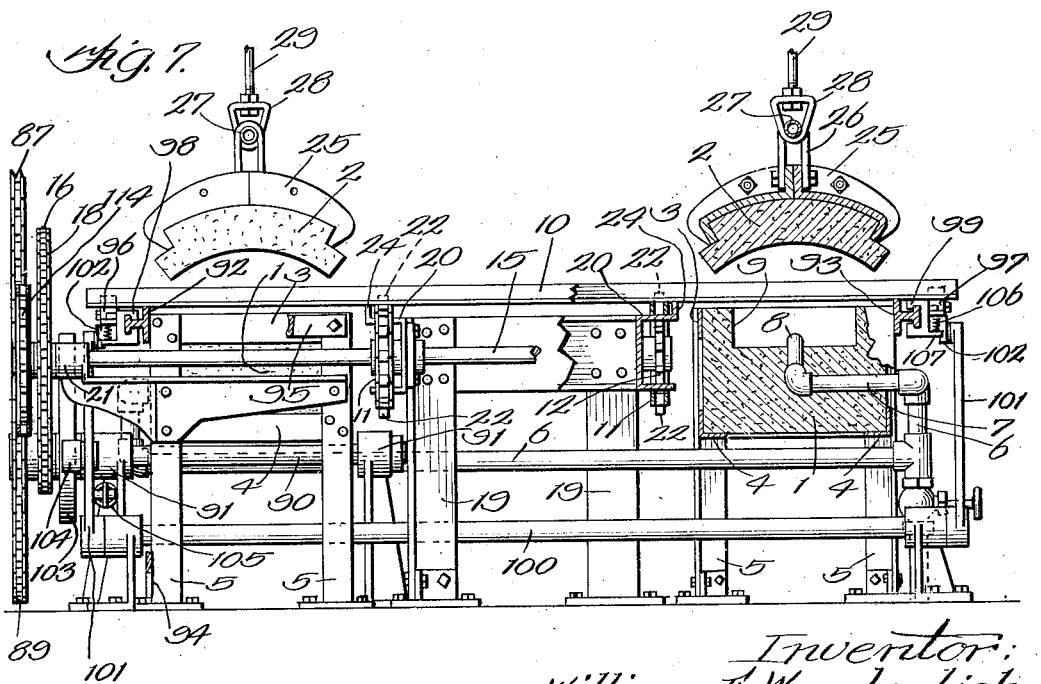

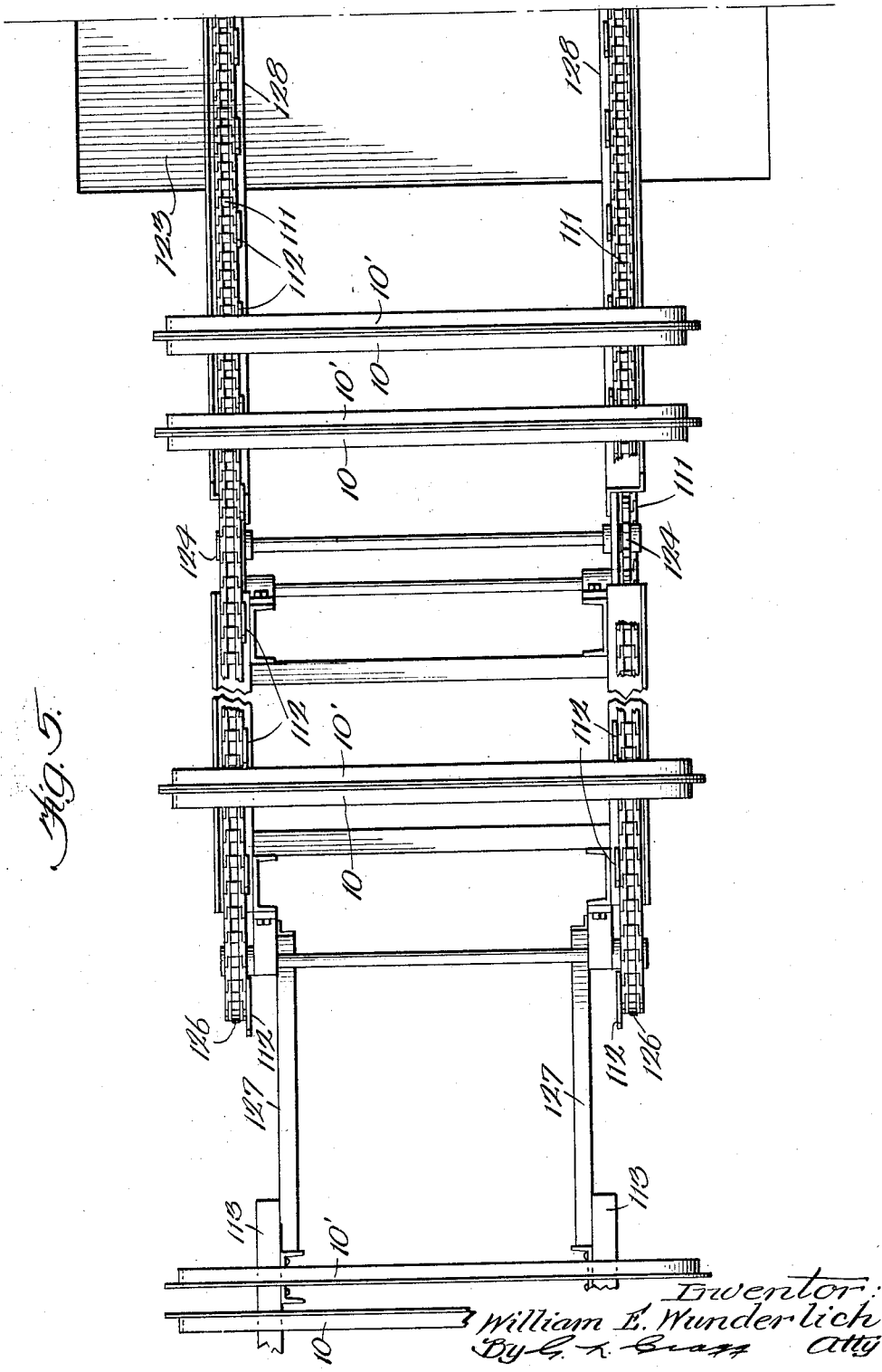

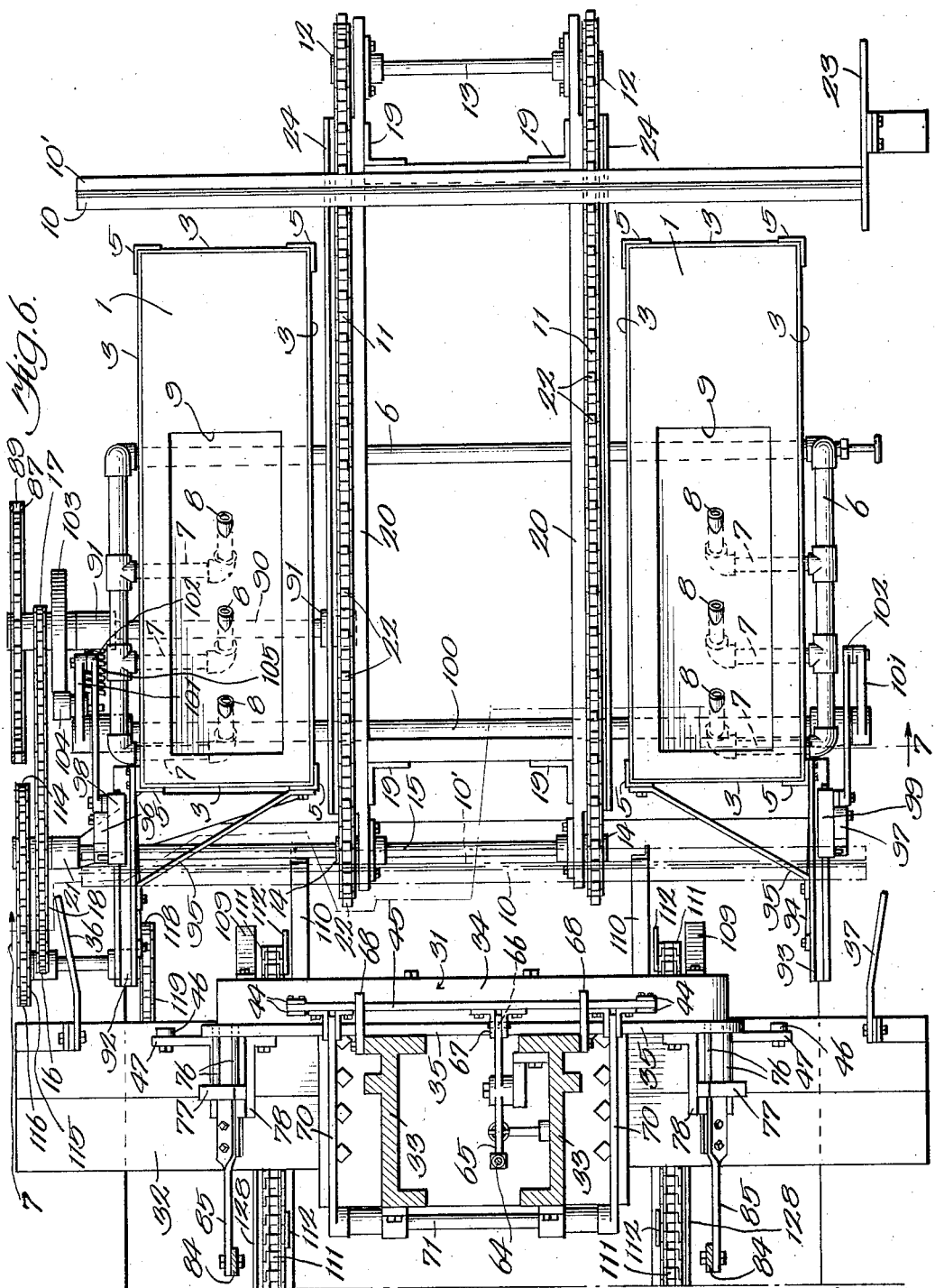

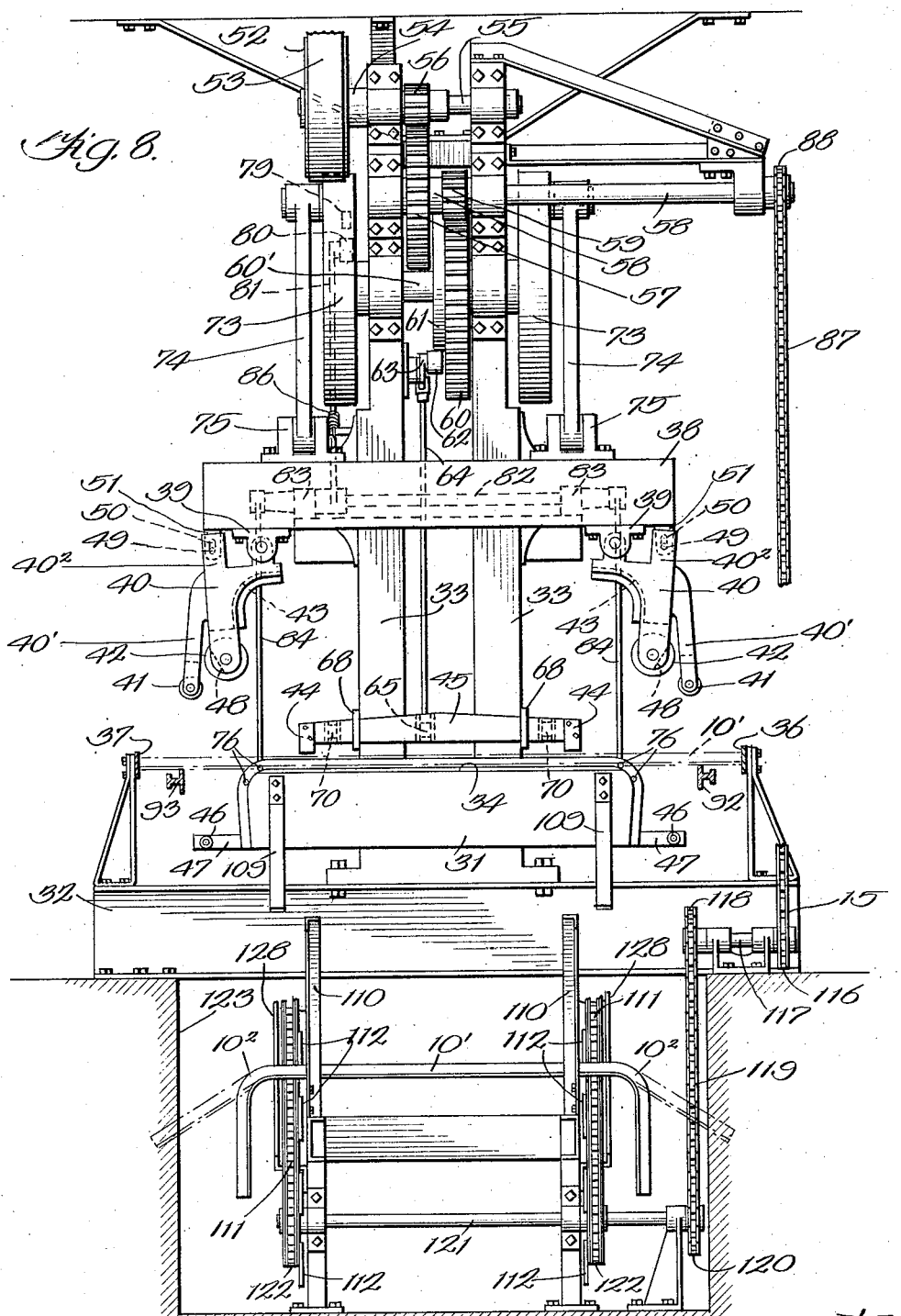

Patented Sept. 13, 1932

1,877,111

UNITED STATES PATENT OFFICE

WILLIAM E. WUNDERLICH, OF MUNCIE, INDIANA, ASSIGNOR TO THE MOORE COMPANY, OF MUNCIE, INDIANA, A CORPORATION OF INDIANA

SHAPING MACHINE

Application filed May 28, 1930. Serial No. 456,567.

My invention relates to shaping machines operating in conjunction with furnaces which serve to heat iron bars in preparation for their shaping by the shaping machines. In accordance with my invention I employ transfer mechanism for delivering the heated objects from the furnaces to the shaping machines. The equipment of my invention also includes improved means for delivering the shaped objects from the shaping machines and delaying the transfer thereof to their immediate destination for cooling.

My invention is of particular service in connection with the shaping of angle irons for inclusion in the formation of frames for bed springs. In carrying out the invention I employ a main conveyor for removing the angle irons or other heated objects from the furnace and supplemental conveying mechanism bridging the gap that exists between the conveying mechanism and the associated shaping machine. The conveying mechanism that is employed for removing the heated objects from the furnace is desirably inclusive of an endless chain which also conveys the objects into the furnace for heating. A spacing intervenes between this conveying machine and the shaping machine across which the heated objects have hitherto been transferred by hand. In the case of the formation of frame portions out of angle irons it has been the practice to employ two men for transferring the heated angle irons from the aforesaid conveyor chain to the shaping machine. I am able to dispense with the services of these men.

The invention will be more fully explained in connection with the accompanying drawings illustrating the preferred embodiment of the invention and in which Figs. 1, 2, 3 and 4, taken collectively, is a side elevation with parts in section and parts omitted, the right hand end of Fig. 1 being in register with the left hand side of Fig. 2, at the bottom thereof, the right hand side of Fig. 2 being in register with the left hand side of Fig. 3 at the bottoms of these two figures, and the bottom side of Fig. 2 being in register with the top side of Fig. 4; Figs. 5 and 6, taken collectively, with the right hand end of Fig. 5 in register with the left hand side of Fig. 6, constitute a sectional view on line 5—5 of Figs. 1, 2, and 3, some parts being omitted; Fig. 7 is a sectional view taken generally on line 7—7 of Fig. 6; Fig. 8 is a sectional view on line 8—8 of Figs. 2 and 4, with these two figures assembled as previously stated; Fig. 9 is a view of part of the mechanism appearing in Fig. 2 with portions in changed positions and portions removed; Fig. 10 is an enlargement of a portion appearing in Fig. 2; and Fig. 11 is a sectional view on line 11—11 of Fig. 10.

The equipment illustrated is inclusive of two heating furnaces. Each heating furnace is inclusive of a body portion 1 which may be formed mainly of fire clay and a cap portion 2 also formed mainly of fire clay. Said body portion has its top side bound by iron strips 3 and its bottom corners seated within angle irons 4. The bordering elements 3 and 4 are riveted to pedestals 5 which support the body portion of the furnace a sufficient distance above the floor of the room in which it is contained.

The fuel employed is preferably gas, which is supplied from main piping 6 through branch pipes 7, which terminate in nozzles 8. I have illustrated three of such nozzles for each furnace and desirably sloping toward the rear end thereof. The nozzles of each furnace terminate in the combustion chamber or fire box 9 thereof and the rear end of the furnace toward which they project is about equal in length to the length of the fire box, the furnace being of substantially uniform cross sectional area, inclusive of the fire box or chamber 9, throughout the length of the furnace. The furnace is thus provided with a massive heat retaining portion which is gradually brought to high heat by the flames issuing from the nozzles, but this heat at the heavy part of the furnace body is more evenly distributed than in the region of the nozzles and is not as great. The objects 10, 10' that are to be heated are introduced to the heating furnaces at the rear thereof so as to be first subject to the more equable and less violent heat at the rear portions of the furnace bodies. These objects are slowly moved along and over the top of each furnace body so as to be gradually heated to a point where they may be further heated by the flames issuing from the nozzles without distortion or injury. The objects to be heated are illustrated as being two angle iron strips assembled in pairs and designed for the construction of mattress supporting frames, one half of such a frame being illustrated in Fig. 8. The apparatus illustrated is intended to produce such halves of mattress frames which are suitably assembled into complete frames by means which has not been illustrated and which forms no part of my present invention. Means for effecting the progress of the objects, which are to be heated, are desirably inclusive of two sprocket chains 11 which turn in upright planes and are disposed between the two furnaces. These sprocket chains pass over idler sprocket wheels 12 which are carried upon the shaft 13. Said chains also pass over driving sprocket wheels 14 which are provided upon a shaft 15. A sprocket wheel 16 is secured upon an extension of the shaft 15. A sprocket pinion 17 drives the sprocket wheel 16, at reduced speed, through the intermediation of a sprocket chain 18. Pedestals 19 support the channel iron beams 20 upon which the shafts 13 and 15 are journaled. A bearing 21 is provided at the outer end of the extended portion of the shaft 15. Alternate links of the sprocket chains 11 carry dogs 22 which are arranged abreast in pairs. The objects 10, 10' that are to be heated are positioned to be respectively engaged by pairs of said dogs, these objects being brought into uniform position by being abutted against a gauge stop 23. The tops or caps 2 of the furnaces are, similarly to the bodies of the portions, located abreast and are spaced apart from these furnace body portions a distance which is slightly greater than the width of the objects being heated. The spaces between the furnace bodies and furnace caps are desirably straight, the beams 20 being formed with wings 24 which terminate slightly above the furnace bodies and sufficiently below the furnace caps to afford supports for the objects or work 10, 10' to give these objects a straight line to travel, while being heated, and to relieve the sprocket chains of their weight while such objects are in travel. The furnace caps are desirably also made of fire clay or fire brick and are suspended from hangers which are inclusive of jaw portions 25 that grip the furnace caps, the stirrups 26 which are carried by said jaw portions, a rod 27 passing through said stirrups, stirrups 28 through which the rod 27 also passes, and hanger rods formed in sections 29 which are connected by the turnbuckles 30. These turnbuckles serve to adjust the width of the gaps between the bodies and caps of the two furnaces. The bottom surfaces of the furnace caps are desirably concave, being preferably of cylindrical curvature with the axes of such curvature, respectively at the mouths of each group of nozzles 8. The nozzle flames strike the bottoms of the objects 10, 10' and the heat therefrom is reflected from the furnace caps downwardly upon said objects and also upon the heavy rear portions of the furnace bodies, whereby the objects are thoroughly, gradually and properly heated before they are passed to the bulldozer or other machine that is to work upon such objects. It is observed that the heat is applied to the elements 10, 10' where the bends $10^2$ are to occur and is not elsewhere directly applied, whereby the heat is conserved as much as possible. The heating is gradually commenced and gradually increased so that the objects are not distorted or injured when finally subjected to the hottest portions of the heat sources, the flames from the nozzles 8. The mechanism thus far described forms the subject matter of my copending application Serial No. 456,565 filed May 28, 1930.

The heated work is next transferred to a shaping machine which may be of the construction illustrated. The shaping machine shown is inclusive of an anvil 31 bottomed upon a pedestal 32 and is bolted against the front side of two spaced apart uprights 33 which are also bottomed upon the pedestal and are desirably bolted thereto. The anvil has a broad work engaging face 34 which is horizontal at the top and has two side continuations which slightly converge, the corners between the anvil top and sides being rounded, as indicated. The anvil desirably has a positioning rib or gauge 35 which is formed along the top and sides of the anvil and at the rear thereof. The work illustrated comprises two angle iron bars 10, 10' which are placed back to back with these backs upright, the rear edge of the angle iron bar 10 being engaged with the rib 35, whereby both bars are positioned with reference to the shaping mechanism upon the head that is to operate thereon. When the angle iron bars are placed upon the anvil they desirably project to equal extents beyond each end of the anvil, as shown by dot and dash lines in Figs. 6 and 8, whereby a shape is ultimately imparted to the angle iron bars, as indicated in full lines in Fig. 8. Such positioning of the angle iron bars is accurately determined by means of two forwardly converging guide bars 36, 37 which project rearwardly. The reciprocable head which cooperates with the anvil is inclusive of a heavy horizontal bar 38, brackets 39 carried by and depending from the bar 38, shaping die blocks or members 40 pivoted upon and extending from said brackets and work engaging rollers 41 and 42 journaled upon and at the lower portions of said die members. Each of these die members is formed with an arcuate groove 43 of a depth equal to or slightly deeper than the width of the portions of the backs of the angle irons 10 and 10' that project beyond the remaining sides of these irons. The side walls of the groove 43 and the transverse walls thereof are of concentric curvature approximately conforming to the curvature that is to be imparted to the angle irons at the curved corners illustrated in Fig. 8. The angle iron bars are desirably heated at the parts thereof that are to be bent into curved corners, so as readily to yield to the shaping action of the machine. The rollers 41, which are carried upon bifurcated finger shaped portions 40' of the members 40 first engage the work. These rollers are provided with tapering peripheral groves between which the adjacent edges of the angle iron bars are engaged, the converging sides of these grooves placing and maintaining the backs of the angle iron bars closely together in the regions of these tapering grooves. During the downward movement of the heavy bar 38 and the balance of the head of the machine assembled therewith, the rollers 41 partially bend the angle iron bars approximately thirty degrees to their lengths as indicated by dot and dash lines in the lower part of Fig. 8. When the angle iron bars are thus partially bent, the rollers 42 encounter the angle iron bars and press them against the slightly downwardly converging ends of the anvil. Each of these rollers is provided with a peripheral groove 42' midway of its length and of a radial depth equal to the depth of the grooves 43. The width of each groove 42' is equal to the widths of each of the grooves 43 to snugly receive the contacting backs of the angle iron bars and to maintain them in close assembly during the forming operation in the region of the rollers 42. I desirably provide a clamping member which includes two pairs of pressure feet 44 which are carried by and depend from the horizontal bar 45 which is also vertically reciprocable. The feet 44 engage the horizontal sides of the angle iron bars and prevent these bars from buckling upwardly where they rest upon the top of the anvil. The feet of each pair are spaced apart a distance to snugly receive the contacting backs of the angle iron bars therebetween.

The rollers 42 are moved inwardly by any suitable means as they continue their downward movement after engaging the angle iron bars to press the end portions of these bars against the converging ends of the anvil. In the embodiment of the invention illustrated, the anvil is provided with cam rollers 46 which are carried upon lateral continuations 47 of the anvil. These cam rollers engage the cam faces 48 of the swinging members 40. These cam faces converge downwardly and are of such direction as to cooperate with the cam rollers 46 to cause the inward movement of the rollers 42 to press the angle iron bars against the end of the anvils and to maintain these angle iron bars in engagement with the anvils after the rollers 42 have been thus inwardly moved. In order that the rollers 41 and 42 may be carried by the same members 40 and in order that the rollers 41 may perform their function, said members are permitted a limited range of swinging movement defined by the finger portions 40² of the members 40 that closely approach the heavy bar 38 which, by being engaged by these fingers, limits the extent to which the members 40 may be outwardly swung to firmly hold the rollers 41 in functioning positions. After the rollers have been brought to their final downward positions, the head of the machine and the clamping members 44 and 45 are withdrawn and the work is removed from the anvil. The work springs to the final shape shown in Fig. 8 where the end portions of the angle iron bars are at right angles to the intermediate portions of these bars. Two pairs of bars, shaped as shown in Fig. 8, have their ends suitably brought into assembly to form the desired rectangular bed spring frame. After the head has been elevated and the work has been removed the die members 40 swing inwardly, by gravity. The extent to which these die members may inwardly swing is limited by pins 49 carried upon the fingers 40² and the lower ends of upright slots 50 formed through fingers 51 that depend from the ends of the heavy bar 38.

Unitary and power driven mechanism is desirably employed for operating, in orderly sequence, the vertically reciprocable head 38 etc. of the machine, the vertically reciprocable clamping jaw 44, 45 and the work ejecting mechanism which is preferably employed and which will later be described, though the invention is not to be thus limited. Power is derived from a pulley 52 which is continuously driven by a belt 53. This pulley is fixed upon the horizontal shaft 55. The spur pinion 56, fixed upon the shaft 55, is coupled with the pulley 52 with which it is coaxial. This spur pinion engages the spur gear 57 which is fixed upon a shaft 58. This shaft carries a spur pinion 59 which meshes with a spur gear 60 whose shaft 60' is journaled upon the uprights 33. A cam 61 is fixed with respect to the spur gear 60 to turn therewith. This cam is engageable with a cam roller 62 which is mounted upon one end of an intermediately pivoted arm 63. The other end of this arm is connected by a rod 64 with one end of an intermediately pivoted arm 65. The other end of this arm is in pin and slot connection 66 with a bracket 67 that is carried by the bar 45. The cam, at the proper time, thus serves to apply the clamp, the clamp being applied before the work shaping head 38 etc. is depressed. The bar 45 of the clamp is desirably guided in the vertical slots that are formed in the plates 68 that are bolted to the uprights 33. In order to maintain the bar 45 horizontal, it has pin and slot connections 69 with the adjacent ends of the horizontal arms 70 whose other ends are fixed upon a horizontal shaft 71 which is journaled at 72 upon the uprights 33.

The work having been clamped in place upon the anvil, the head 38 etc. is depressed. The mechanism for depressing and elevating, that is for reciprocating, such head is inclusive of the crank discs 73 which are fixed upon the shaft 60' of the spur gear 60. These crank discs are connected by a pitman 74 with the heavy bar 38 of the shaper head, as indicated at 75.

After the work has been shaped and the head 38 etc. has been sufficiently raised, the work is ejected from the anvil. The mechanism for ejecting the work is inclusive of pairs of horizontally movable pins 76 at the ends of the anvil and located at the curved corners thereof, these pins being movable crosswise of the anvil, as will appear.

Each pair of pins is fastened to a crosshead 77 individual thereto which is slidably mounted in guideways in a bracket 78 mounted at the rear of the anvil. The pins 76 project through holes in the anvil rib portion 35. Both pairs of pins are actuated simultaneously by a cam lug 79 on the periphery of one of the crank discs 73. This lug engages a cam roller 80 provided upon a rocker arm 81 that is secured to a horizontal shaft 82. This shaft is mounted in bearings 83 provided upon the rear of the uprights. This shaft is fixedly connected at its ends with the upper ends of rocker arms 84 whose lower ends are pivotally connected to rearward extensions 85 of crossheads 77. The pins 76 are retracted and the roller 80 urged against the edge of the disc 73 by means of a tension spring 86 having one end secured to the upright 33 and the other end secured to the rocker arm 81.

The shaping machine described forms the subject matter of my copending application Serial No. 456,566 filed May 28, 1930.

The sprocket pinion 17 which drives the work conveying chains 11 may be driven by the belt 53 through the intermediation of the sprocket chain 87 which is driven by a sprocket pinion 88 fixed upon the shaft 58. This sprocket chain drives a sprocket wheel 89 which is fixed upon the same shaft 90 on which the sprocket pinion 17 is also fixed. This shaft is journaled within bearings that are carried by the pedestals 91.

In accordance with my present invention the heated angle iron bars 10, 10' are automatically advanced from the conveyor chains 11 to the anvil 31, whereby the work of two men hitherto employed for effecting the transfer of the work from the furnace to the shaping machine is dispensed with. A support bridges the gap between the chains 11 and the anvil 31 for the purpose of transferring the work to the anvil. This bridge or support desirably includes two I-beams or rails 92, 93, which are laid upon their sides and are spaced from the anvil lengthwise of the anvil. These rails are bolted to the outer pedestals 5 at one end of each rail, the other ends of the rails being secured by the oblique struts 94 to two of the pedestals 5. Horizontal struts 95 connect intermediate portions of said rails with some of the pedestals 5. The forward ends of the rails 92, 93, the ends that are adjacent the shaping machine, project slightly beyond the plane of the vertical face of the anvil 31 that is remote from the rib 35. That is these rails slightly lap the ends of the anvil, whereby the angle iron bars 10, 10' do not completely leave said rails until they engage the anvil. When the angle iron bars have been placed in engagement with the rib 35 they are clear of the forward ends of the rails 92, 93 although, before being shaped, said angle irons extend laterally of the shaping machine beyond such rails. When the angle iron bars are being formed into U-shape, the ends thereof which project beyond the anvil, are bent downwardly and clear said rails as they are being thus bent. When the angle iron bars are formed and are still upon the anvil they do not extend to the rails being sufficiently clear thereof to permit the formed angle iron bars to be removed from the anvil by the mechanism which has been described.

Suitable mechanism is employed for removing the angle iron bars from the sprocket chains 11, such removal being initiated just as the parts of the sprocket chains upon which the angle iron bars rest enter the half turns at the delivery ends of the sprocket chains, Fig. 2. The preferred mechanism employed for this purpose is inclusive of two horizontal reciprocable pawls 96 and 97 which are desirably pivoted upon slide blocks 98, 99. These slide blocks are slotted to respectively receive one flange of the corresponding I-beam 92 or 93, these I-beams being arranged lengthwise of the travel of the angle iron bars, consequently, guide the slide blocks and the pawls thereon lengthwise of the travel of said angle iron bars. Said pawls and the slide blocks on which they are pivoted are caused to travel bodily in unison backward and forward. To this end, I couple a shaft 100 with said slide blocks and oscillate this shaft in order to reciprocate these blocks. The means for connecting this shaft with said blocks desirably resides in arms 101 which are fixed upon the shaft and links 102 which connect the arms with the blocks. The means for oscillating said shaft 100 desirably includes a cam 103 which is fixed upon the shaft 90. This cam engages a cam roller 104 upon one of the arms 101, this cam roller being held in engagement with the cam by means of a spring 105 connected, at one end, with this arm and at the other end with one of the pedestals 91. Said pawls are upwardly pressed by springs 106 which are bottomed upon bracket extensions to the aforesaid slide blocks. During forward or discharging movement of the slide blocks, said pawls are pressed to their uppermost positions against stops 108 which are provided upon the slide blocks. When the pawls are in this position they are engageable with the next pair of angle iron bars to be discharged from the heating furnaces to the shaping machine. The slide blocks are moved sufficiently forward, in their angle iron bar discharging movement, to place the foremost angle iron bar of a pair against the rib 35 of the anvil. The slide blocks and the pawls thereon are thereafter withdrawn into a position to engage the next pair of angle iron bars. Before engaging such pair of angle iron bars the pawls engage the bottom faces of such bars and are depressed against the force of the springs 106. After clearing these pairs, the said springs elevate the pawls in position to engage these bars.

It is understood that the angle iron bars are being moved forwardly by the conveyor chains 11 until the pawls have discharging engagement with the angle iron bars, whereafter the forward movement of such bars is accelerated by the pawls in order that they may be properly discharged from said chains onto the anvil. The discharging pawls complete a cycle of operations each time the conveyor chains 11 advance a pair of angle iron bars a distance equal to the space between the meeting faces of the angle iron bars of two adjacent pairs. Just as the pawls are rearwardly moved or withdrawn from the angle iron bars that have been fully placed upon the anvil, the clamping members 44 are applied, immediately whereafter the forming head of the shaping machine, inclusive of the rollers 41, 42 is lowered with the results that have been previously described. After the angle iron bars have been shaped, they are discharged by the discharging mechanism which is inclusive of the discharging pins 76, this discharging mechanism operating as hitherto described. The end portions of the angle iron bars, being now bent downwardly, are clear of the rails 92, 93, so that they may be discharged without interference by these rails. As there are no other parts that interfere with the discharging movement of the formed angle iron bars they may be disposed of as desired.

As the formed angle iron bars are still hot, I desirably provide a long course of travel for them during which they may become sufficiently cooled to be handled. In the preferred embodiment of the invention, I provide deflecting fingers 109 which are mounted upon the anvil 31 and are sloped rearwardly, that is toward the conveyor chains 11, to clear the formed angle iron bars from the anvil. These deflecting fingers engage the intermediate or horizontal sides of the formed angle iron bars so as to direct these bars, in their descent, upon the forwardly and downwardly sloping guide bars 110. The members 109, in effect, constitute a chute which is downwardly and rearwardly inclined while the members 110 constitute a chute which is downwardly and forwardly inclined, suitable spacing intervening between these two chutes permitting the formed angle iron bars to leave the chute 109 and enter the chute 110. The latter chute is proportioned and disposed to engage the horizontal sides of the formed angle iron bars and to direct these angle iron bar sides upon the upper stretches of the conveyor sprocket chains 111. Dogs 112 are carried by and distributed at suitable intervals along the sprocket chains 111, whereby the formed angle iron bars are conveyed forwardly away from the shaping machine to the place of deposit at which are located two channel beams 113 upon which the finished angle iron bars are straddled to be removed by hand or otherwise for their intended purpose. These channel beams are desirably located so far away from the shaping machine and the rate of travel of the sprocket chain 111 is such that the angle irons are sufficiently cooled, when they reach their receiver or deck 113 of table height, as to be manipulated without danger of burning the attendant. As illustrated, the chains 111 are driven from the shaft 15 by a sprocket wheel 114 fixed upon the shaft, this sprocket wheel driving a sprocket chain 115 which drives a sprocket pinion 116 upon a shaft 117 upon which is also fixed another sprocket pinion 118. The latter sprocket pinion drives a sprocket chain 119 which, in turn, drives a sprocket pinion 120. This sprocket pinion is fixed upon a shaft 121 which is also fixed upon sprocket pinions 122. These latter sprocket pinions drive the sprocket chains 111. The sprocket chains 111 and 119 and the chute 110 desirably extend into a pit 123 whose top is at the level of the floor upon which the pedestals 91 etc. are carried, on which account the orbit of the chain 111 is made angular by means of the idler sprockets 124, 125 operating in conjunction with the sprockets 122 that are in the pit and the idler sprockets 126 that cooperate with the sprockets 124 to maintain the portion of the sprocket chain 111 between the sprockets 124 and 126 substantially horizontal. The sprockets 124 and 126 are desirably a long distance apart, say seventy-five feet to allow sufficient time for the angle iron bars to cool. The portions of the sprocket chains between the idler sprockets 126 and the idler sprockets 124 and 125 are so positioned as to be head high to permit the space traversed thereby to be used for other purposes. As the decks 112 are rounding the sprocket pinions 126 they discharge the formed angle iron bars upon the inclined sides or chute 127 which direct these angle iron bars upon the receiver or deck 113. In order to relieve the chains 111 of the weight of the angle iron bars the load supporting stretches of these chains may ride upon Z bars 128.

Changes may be made without departing from the invention.

Having thus described my invention, I claim:

1. The combination with a shaping machine that is inclusive of an anvil and a head in cooperative relation therewith for shaping bars delivered to the anvil; of a furnace for heating the aforesaid bars; an endless conveyor related to the furnace for removing such bars, after heating, from the furnace, said endless conveyor being spaced apart from the aforesaid anvil; a bridging member positioned to receive heated bars transferred thereto by said endless conveyor; and reciprocating mechanism for engaging the bars upon said bridging member and moving the same onto said anvil.

2. The combination with a shaping machine that is inclusive of an anvil and a head having cooperating formations for bending bars into U-form; of a furnace for heating the aforesaid bars; an endless conveyor related to the furnace for removing such bars, after heating, from the furnace and extending angularly to the anvil, said endless conveyor being spaced apart from the aforesaid anvil; and two conveying means positioned to receive end portions of the bars when such bars are discharged by said endless conveyor, said conveying means being withdrawable from the bars to afford a clear space through which the end portions of the bars may be bent, said conveying means being also spaced apart from the anvil lengthwise of the anvil to afford a clear space through which the bent bars may be discharged from the anvil.

3. The combination with a shaping machine that is inclusive of an anvil and a head having cooperating formations for bending bars into U-form; of a furnace for heating the aforesaid bars; an endless conveyor related to the furnace for removing such bars, after heating, from the furnace and extending angularly to the anvil, said endless conveyor being spaced apart from the aforesaid anvil; and two bridging members positioned to receive end portions of the bars when such bars are discharged by said endless conveyor, said bridging members being positioned to be clear of the bars when fully placed upon the anvil to permit end portions of these bars to be bent, and being also spaced apart from the anvil lengthwise of the anvil to afford a clear space through which the bent bars may be discharged from the anvil.

4. The combination with a shaping machine that is inclusive of an anvil and a head having cooperating formations for bending bars into U-form; of a furnace for heating the aforesaid bars; an endless conveyor related to the furnace for removing such bars, after heating, from the furnace and extending angularly to the anvil, said endless conveyor being spaced apart from the aforesaid anvil; two bridging members positioned to receive end portions of the bars when such bars are discharged by said endless conveyor, said bridging members being positioned to be clear of the bars when fully placed upon the anvil to permit end portions of these bars to be bent, and being also spaced apart from the anvil lengthwise of the anvil to afford a clear space through which the bent bars may be discharged from the anvil; and reciprocating mechanism for moving the bars along said bridging members onto the anvil and clear of said bridging members.

5. The combination with a plurality of furnaces arranged abreast; of an endless conveyor arranged abreast of the furnaces which have openings for receiving end portions of iron bars carried by the conveyor along the furnaces; a shaping machine including an anvil and a shaping head cooperating with the anvil, said anvil and head having cooperating formations for engaging end portions of the bars and bending the bars into U-form, said endless conveyor being angular to the anvil; and means for transferring heated bars from said conveyor across the spacing between such conveyor and the anvil and onto said anvil.

6. The combination with a plurality of furnaces arranged abreast; of an endless conveyor arranged abreast of the furnaces which have openings for receiving end portions of iron bars carried by the conveyor along the furnaces; a shaping machine including an anvil and a shaping head cooperating with the anvil, said anvil and head having cooperating formations for engaging end portions of the bars and bending the bars into U-form, said endless conveyor being angular to the anvil; a bridging member positioned to receive heated bars transferred thereto by said endless conveyor; and reciprocating mechanism for engaing the bars upon said bridging member and moving the same onto said anvil.

7. The combination with a plurality of furnaces arranged abreast; of an endless conveyor arranged abreast of the furnaces which have openings for receiving end portions of iron bars carried by the conveyor along the furnaces; a shaping machine including an anvil and a shaping head cooperating with the anvil, said anvil and head having cooperating formations for engaging end portions of the bars and bending the bars into U-form, said endless conveyor being angular to the anvil; and a bridging member positioned to receive heated bars transferred thereto by said endless conveyor and to be in supporting relation to said bars until they reach the anvil.

8. The combination with a plurality of furnaces arranged abreast; of an endless conveyor arranged abreast of the furnaces which have openings for receiving end portions of iron bars carried by the conveyor along the furnaces; a shaping machine including an anvil and a shaping head cooperating with the anvil, said anvil and head having cooperating formations for engaging end portions of the bars and bending the bars into U-form, said endless conveyor being angular to the anvil; and two conveying means positioned to receive end portions of the bars when such bars are discharged by said endless conveyor, said conveying means being withdrawable from the bars to afford a clear space through which the end portions of the bars may be bent, said conveying means being also spaced apart from the anvil lengthwise of the anvil to afford a clear space through which the bent bars may be discharged from the anvil.

9. The combination with a plurality of furnaces arranged abreast; of an endless conveyor arranged abreast of the furnaces which have openings for receiving end portions of iron bars carried by the conveyor along the furnaces; a shaping machine including an anvil and a shaping head cooperating with the anvil, said anvil and head having cooperating formations for engaging end portions of the bars and bending the bars into U-form, said endless conveyor being angular to the anvil; and two bridging members positioned to receive end portions of the bars when such bars are discharged by said endless conveyor, said bridging members being positioned to be clear of the bars when fully placed upon the anvil to permit end portions of these bars to be bent, and being also spaced apart from the anvil lengthwise of the anvil to afford a clear space through which the bent bars may be discharged from the anvil.

10. The combination with a plurality of furnaces arranged abreast; of an endless conveyor arranged abreast of the furnaces which have openings for receiving end portions of iron bars carried by the conveyor along the furnaces; a shaping machine including an anvil and a head having cooperating formations for engaging end portions of the bars and bending the bars into U-form, said endless conveyor being angular to the anvil; two bridging members positioned to receive end portions of the bars when such bars are discharged by said endless conveyor, said bridging members being positioned to be clear of the bars when fully placed upon the anvil to permit end portions of these bars to be bent, and being also spaced apart from the anvil lengthwise of the anvil to afford a clear space through which the bent bars may be discharged from the anvil; and reciprocating mechanism for moving the bars along said bridging members onto the anvil and clear of said bridging members.

11. The combination with a shaping machine that is inclusive of an anvil and a head in cooperative relation therewith for shaping bars delivered to the anvil; of a furnace for heating the aforesaid bars; a conveyor related to the furnace for removing such bars, after heating, from the furnace, said conveyor being spaced apart from the aforesaid anvil; a bridging member positioned to receive heated bars transferred thereto by said conveyor; and reciprocating mechanism for engaging the bars upon said bridging member and moving the same onto said anvil.

12. The combination with a shaping machine that is inclusive of an anvil and a head in cooperative relation therewith for shaping bars delivered to the anvil; of a furnace for heating the aforesaid bars; a conveyor related to the furnace for removing such bars, after heating, from the furnace, said conveyor being spaced apart from the aforesaid anvil; and a bridging member positioned to receive heated bars transferred thereto by said conveyor and to be in supporting relation to said bars until they reach the anvil.

13. The combination with a shaping machine that is inclusive of an anvil and a head having cooperating formations for bending bars into U-form; of a furnace for heating the aforesaid bars; a conveyor related to the furnace for removing such bars, after heating, from the furnace and extending angularly to the anvil, said conveyor being spaced apart from the aforesaid anvil; and two conveying means positioned to receive end portions of the bars when such bars are discharged by said conveyor, said conveying means being withdrawable from the bars to afford a clear space through which the end portions of the bars may be bent, said conveying means being also spaced apart from the anvil lengthwise of the anvil to afford a clear space through which the bent bars may be discharged from the anvil.

14. The combination with a shaping machine including an anvil and a cooperating head; of a furnace for heating work that is to be applied to said shaping machine; mechanism for passing work from the furnace to the shaping machine; a chute positioned to receive work discharged from the shaping machine; and an endless conveyor positioned with respect to the chute to receive work therefrom, said endless conveyor having a work engaging upper stretch and wheels positioned to incline the conveyor adjacent the chute and thereafter to continue the conveyor substantially horizontal.

In witness whereof, I hereunto subscribe my name.

WILLIAM E. WUNDERLICH.